March 19, 1968　　　G. A. ROBERTS　　　3,374,363
DETECTOR CONTROL CIRCUIT USING AN SCR IN A BALANCED BRIDGE
Filed Aug. 30, 1963
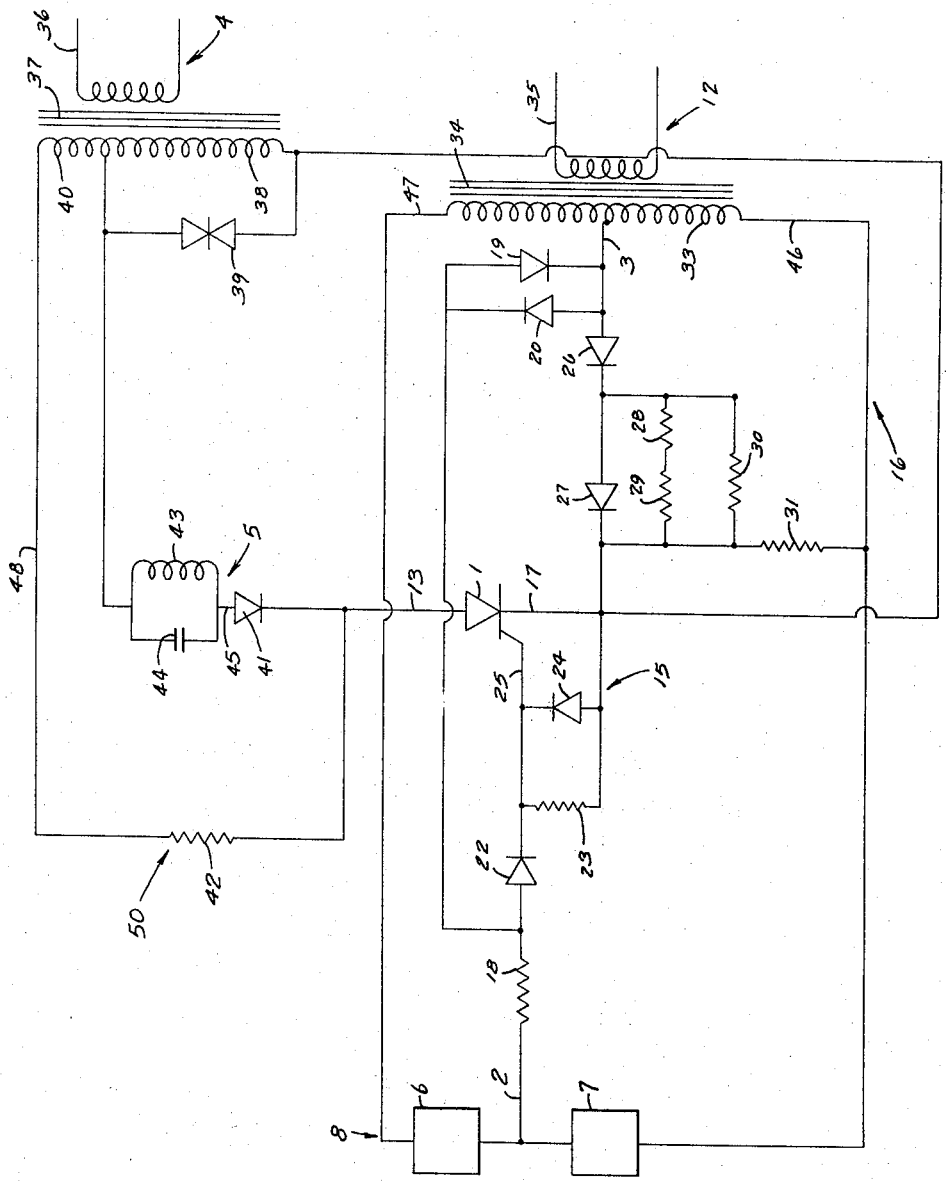
INVENTOR.
GORDON A. ROBERTS
BY
ATTORNEYS ![](United States Patent Office) 3,374,363
Patented Mar. 19, 1968

3,374,363
DETECTOR CONTROL CIRCUIT USING AN SCR IN A BALANCED BRIDGE
Gordon A. Roberts, Ann Arbor, Mich., assignor to Charles F. Warrick Company, Berkeley, Mich., a corporation of Michigan
Filed Aug. 30, 1963, Ser. No. 305,701
26 Claims. (Cl. 307—252)

This invention relates to a control circuit providing a two-state output determined by the value of the input to said circuit with respect to a predetermined threshold value, and, more particularly, the invention relates to a circuit of the type described providing null detection.

The embodiment of the invention herein disclosed was developed as a liquid level control using a probe to control liquid flow into a reservoir. In this use, as the liquid in the reservoir rises or falls, respectively, to certain predetermined points, the control circuit changes from one to the other of its two states thereby producing an output for effecting liquid flow into (or out of) the reservoir. However, it will be apparent from reading the following disclosure that the circuit embodying the invention is in no way limited to use as a liquid level control. Said circuit may be used in a wide variety of situations requiring means capable of changing from one clearly defined state to another as a variable passes through a particular value. Therefore, in its broader aspects this invention is not limited to liquid level sensing.

A preferred embodiment of the invention includes a bridge circuit supplying a null detector. It is well known that the null point of a bridge comprised of linear elements is independent of the input signal magnitude. Thus, if a bridge has a detector which is in one state at one side of bridge null and in another state for the opposite side of bridge null, the operation of the bridge and detector will be relatively insensitive to the supply voltage changes.

In the prior art, two-state control circuits of attractive simplicity have not employed bridge circuitry and therefore their operation has often been highly dependent on supply voltage changes. On the other hand, previous two-state circuits which have employed bridges have usually required overly complex detectors for correct functioning as a control circuit. Thus, in the past, simple circuits generally had poor stability whereas stable circuits, generally those including bridges, have been undesirably complex and hence expensive.

Hence, the objects of this invention include:
(1) To provide a control circuit yielding a two-state output dependent on change of the input thereto through a predetermined threshold value.
(2) To provide a control circuit, as aforesaid, which is at once of simple construction and is electrically stable.
(3) To provide a control circuit, as aforesaid, comprised of a relatively small number of noncritical, widely available, inexpensive components, which is noncritical in layout and which has easily satisfied power supply requirements.
(4) To provide a control circuit, as aforesaid, which offers an improved stability with respect to line voltage variations and with respect to temperature changes.

Other objects and purposes of this invention will be apparent to persons acquainted with this type of circuit upon reading the following description and inspecting the accompanying drawings which is a schematic diagram of a circuit embodying the invention.

*General description*

In general, the objects and purposes of the invention are met by providing a bridge circuit having a pair of input terminals connected across a suitable voltage source. An impedance defines one of the bridge legs and reflects the independent variable to be sensed.

A null detector circuit is connected across the output terminals of the bridge and includes a trigger device actuable by said output terminals. The trigger device is in series with a load and a voltage source for changing the condition of said load in response to passage of said variable through a predetermined value. The detector circuit includes means protecting the trigger device against excessive current flow and assuring that conduction of the trigger device occurs at bridge null.

*Detailed description*

Referring now to the drawing, the circuit embodying the invention basically comprises a null detector circuit fed by a bridge. The null detector includes a trigger device 1 which is biased for conduction upon the appearance of a potential difference of the correct magnitude and sign between the output terminals 2 and 3 of the bridge circuit 8. The trigger device 1 is in series with an A.C. voltage source 4 and a suitable load 5.

In the following description, the word "null" will denote the voltage condition between the terminals 2 and 3 at which the bias condition on the trigger device 1 moves between the nonconductive and conductive bias states. Neglecting the variation in the parameters of practical components from the ideal, the null condition will be that of zero voltage difference across the terminals 2 and 3. However, in practice, null usually occurs at voltage drop close to but different from zero due to variations in components and the difference from zero voltage drop will vary with the characteristics of the components employed. In certain cases, in fact, it may be desired that null occur at a nonzero voltage point and this can be achieved by a variation of the parameters of the components used.

The bridge circuit 8 includes a series pair of impedances 6 and 7 which define two adjacent legs of the bridge. For purposes of convenience in reference, the impedance 6 will be considered the independent or unknown variable and the impedance 7 will be considered a constant of the circuit. Thus, in one of the uses to which the circuit embodying the invention has been put, the impedance 6 has been a liquid level probe the impedance of which changes with the level of liquid in a reservoir. The bridge 8 is fed by an A.C. source 12 comprising transformer 34 having a primary winding 35 connected to the source of supply voltage and a center tapped secondary winding 33 forming the remaining pair of legs of the bridge 8. The center tap of said secondary 33 forms one output terminal 3 of the bridge 8. The ends 46 and 47 of the secondary 33 connect across the impedances 7 and 6 and, in effect, define the power input terminals of the bridge. The connection between the impedances 6 and 7 forms the other output terminals 2 of the bridge circuit 8. The impedances 6 and 7 may be capacitive, inductive and resistive without changing the essential operation of the bridge. The bridge output between terminals 2 and 3 is phase related in any desired manner to the voltage in the primary 35 of transformer 34. The magnitude of unbalance determines the magnitude of output between the output points 2 and 3.

In the particular preferred embodment of the invention disclosed, the triggering device 1 is a semiconductor controlled rectifier (SCR) having an anode 13, a cathode 17 and a gate 25. Said anode 13 is connected to the load 5 and the cathode 17 is connected to the A.C. source 4 and to the output terminal 3 of the bridge 8.

A current dropping impedance 18, which may be a resistor, connects the bridge output terminal 2 to the anode of a diode 22 which is in turn connected to the gate 25 of the SCR 1. The resistor 18 diminishes forward and rearward current flow through the gate 25 of the SCR 1. The resistance 18 may be omitted if the equivalent source impedance of the bridge remains above a minimum value and thereby acts to reduce current through the gate and cathode of the SCR 1. The diode 22 is oriented to prevent reverse current through gate of the SCR 1 and performs a further function as stated hereinafter. A parallel, oppositely oriented, pair of diodes 19 and 20 connect from the output terminal 3 through the resistance 18 to the output terminal 2. The diode 19 is oriented to bypass some of the forward current around the gate 25 and cathode 17 and limits the peak forward voltage and hence the power applied to the gate 25 of the SCR 1. The diode 20 is provided to minimize the D.C. current flowing in the bridge due to rectification of the bridge A.C. signal by the diode 19. The diode 19 alone causes a pulsating D.C. current in the bridge when said bridge is unbalanced. The diode 20 provides a pulsating D.C. current of opposite sign and phase which is added to the rectified output of the diode 19 to form an A.C. sum signal.

A resistance 23 and diode 24 are paralleled across the gate 25 and cathode 17 of the SCR 1. The resistance 23 prevents false firing of a high sensitivity SCR. The diode 24 bypasses excess reverse current and prevents excess reverse voltage from being placed across the gate 25 and cathode 17 of the SCR 1. Thus, the diodes 19, 20, 22 and 24 along with the resistance 23 form a nonlinear network 15 to limit peak input of the SCR 1.

The null detector circuit also includes compensation circuit 16 for line voltage and temperature compensation and phase detection improvement. The compensation circuit 16 is connected to the cathode 17 of the SCR 1, the output terminal 3 of the bridge 8 and the lower end 46 of the secondary winding 33. The compensation circuit 16 includes a series pair of similarly oriented diodes 26 and 27. The anode of diode 26 connects to the output terminal 3 of the bridge 8 and the cathode of the diode 27 connects to the cathode 17 of the SCR 1. A thermistor 28 and a resistor 29 in series parallel the diode 27 as does a further resistor 30. A biasing resistor 31 connects the cathode 17 of the SCR 1 to the terminal 46 on the secondary 33.

The A.C. source 4 includes a transformer 37. The transformer 37 has a primary winding 36 connected to suitable A.C. mains, not shown, and has a secondary winding 38 connected in series with the SCR 1 and the load 5. Transient voltage limiting means 39 parallel the secondary winding 38.

The transformer 37 has a further secondary winding 40 connected between the load 5 and a firing circuit 50 insuring the firing of the SCR 1 during every cycle when the bridge 8 is near and on the correct side of null. The firing circuit 50 comprises a resistance 42 in series with the secondary winding 40 and further connected to the anode of the SCR 1. The cathode end of a diode 41 connects the resistance 42 and the anode 13 of the SCR 1 to the load 5. The load 5 in this embodiment comprises a relay winding 43 and a filter or averaging capacitor 44 in parallel therewith.

Operation

The phase relationship between the A.C. sources 4 and 12 is selected so said sources maintain the cathode 17 of the SCR 1 in phase with the anode 13 thereof. The circuit may be assembled for either fail-safe high or fail-safe low operation. Fail-safe high operation is achieved when the impedance 6 is controlled, i.e., the set point impedance, and impedance 7 is the input variable. Fail-safe low operation is achieved when the impedance 7 is controlled and the impedance 6 is the input variable. In the foregoing discussion the latter arrangement has been considered. If impedance 6 is small, then the terminal 2 is higher in potential than terminal 3 during the time that the anode 13 is high in potential and the SCR 1 is in its conduction state. If the impedance 6 is now increased sufficiently, it will pass through a threshold value, primarily determined by impedance 7, whereat the SCR 1 will change from its conduction state to nonconduction state and will remain nonconductive while the impedance 6 is above the threshold value. For operation in the inverse manner, the functions of impedances 6 and 7 are interchanged. The detector circuit herein illustrated is constructed so that the SCR 1 fires when the potential of terminal 2 rises above that of terminal 3 and the potential of the anode 13 is above that of the cathode 17.

Assuming then that the potential of the terminal 2 has risen above null, a voltage drop occurs across the gate 25 and cathode 17 of the SCR 1 and biases said SCR 1 for conduction by causing forward current flow through the resistance 18, diode 22, gate and cathode of the SCR 1 and the diodes 26 and 27, said diodes being forwardly biased by the circuit including the resistance 31 and a source of biasing voltage, here the secondary winding 33. The resistance 18, during current flow therethrough has a voltage drop thereacross whereby to limit the current flow through gate 25 of the SCR 1 as mentioned hereinabove.

When a trigger device is employed that has peak forward and reverse voltage, and/or current, as well as peak and average power limitations, it is necessary to insure that these are not exceeded. The SCR 1 is such a trigger device and the resistance 18, and diodes 19, 22 and 24 are used singly or in combination to provide protection for the SCR 1. If no such said limitations existed, then these components 18, 19, 22 and 24 would be unnecessary for the purpose of protection. The use of resistance 18 assures that a minimum source impedance exists independent of the impedances 6 and 7. It will be apparent that to achieve either voltage or current limiting, a suitable source impedance is necessary. However, if the equivalent source impedance of the bridge or other source always exceeds the required minimum, then the resistance 18 is not required for current limiting.

The diode 19 limits peak forward voltage across the gate 25 to cathode 17 circuit. However, if the input characteristic of the SCR 1 is sufficiently stable from device to device, then it may be satisfactory to use the forward gate 25-to-cathode 17 characteristic instead of diode 19 for voltage limiting. The diode 24 is used to reduce inverse voltage between the gate 25 and cathode 17 and may not be required if diode 22 is used. Diode 22 tends to reduce the reverse current or voltage to the SCR 1 gate 25 and cathode 17 junction. The primary function of diode 22 is, however, to provide voltage balance in the circuit for the diodes 26 and 27 if both are present.

The resistor 23 prevents self-firing of the SCR 1 and is used when required by the particular SCR employed.

If the D.C. current in the bridge circuit is excessive for the particular application, due to the rectification action of the detector circuit between terminals 2 and 3, then the said D.C. current can be reduced by diode 20 which provides rectification in the opposite direction giving a net A.C. current but minimizing the D.C. current.

The voltage drops between the terminal 2 and the cathode 17 should ideally be equal to those between the terminal 3 and cathode 17 when the SCR 1 is at the threshold between the conduction state and nonconduction state. Practically, this condition can never be precisely achieved for all desired conditions of temperature and line voltage. But from a practical point-of-view, the desired theoretical operating condition can be approximated closely enough for most applications. The primary function of the diodes 22, 26 and 27, the thermistor 28 and the resistances 29, 30 and 31, individually or in combination, is to achieve adequate compensation.

The input volt-ampere characteristic of the gate-cathode junction of an SCR is similar to a diode. Therefore, a single diode, for example, the diode 26, can be used to approximately compensate for the voltage offset of the SCR trigger point and variations of said offset with temperature. Thus, the circuit illustrated in the figure could be used with diodes 22 and 27 shorted. Sometimes practical components allow better compensation if diode 27 is added with a temperature compensation network consisting of resistors 29 and 30 and temperature dependent resistor or thermistor 28, shunting the diode 27. When the diode 27 is so added best results are usually obtained by inserting the diode 22 in series between terminal 2 and the gate 25 to approximately balance the voltage drop of the diode 27. Roughly the number of diode junctions on each side of the cathode 17 should be equal with the gate-to-cathode path through the SCR 1 being counted as a diode.

The diode 26 and resistor 31 perform a second function. These provide a half-wave rectified signal between the cathode 17 and the end 46. Under some conditions a system malfunction may occur if the cathode 17 is connected to terminal 3 such that SCR 1 is in a partially conducting state when it should be nonconducting. It should be noted that this condition is SCR device dependent and is also dependent upon the actual circuit operating conditions and, therefore, the malfunction does not always occur. This malfunction is a form of phase detection error. Typically, said malfunction occurs when impedance 6 is a nominal finite value and impedance 7 is an open circuit, whereby the load is in an energized state, and then impedance 7 is abruptly changed to a low resistance which should de-energize the load. However, the load may remain partly or fully energized. The probable cause of this trouble is charge storage in the SCR 1. The low impedance condition of the impedance 7 produces a high forward bias in the gate 25-to-cathode 17 junction when the anode 13 is negative. As the anode 13 swings positive it is postulated that charge storage fires the SCR 1. When diode 26 is used with a suitable bias signal, such as produced by resistor 31 as shown, then forward bias of gate 25-to-cathode 17 junction does not occur during times when the anode is negative, and said failure of load to properly de-energize is eliminated.

Now that the SCR 1 has been biased for firing in the manner above described, it will be assumed that SCR 1 is in its conduction state. When a load 5 is used, such as is shown at 44 and 43, the instantaneous voltage at the anode 13 with the resistance 42 open and the diode 41 shorted is the sum of the instantaneous A.C. source voltage from the secondary 38 and a transient voltage from the load 5, said transient voltage being a function of the previous history of the firing of the SCR 1. Thus, the waveform presented to the anode of the SCR 1 is not necessarily the same from cycle to cycle. Since the firing characteristic of practical semiconductor controlled rectifiers is somewhat dependent upon anode-to-cathode voltage, it is sometimes necessary to present a consistent waveform to the anode 13 from cycle to cycle. This is accomplished by the winding 40, the diode 41 and the resistance 42. The diode 41 decouples the load 5 from the anode 13 when the instantaneous voltage at point 45 is below the value at point 48, which is most of the time for the load 5 shown, and thus the instantaneous voltage at the anode 13 is essentially the same as at the point 48 just before firing of the SCR 1 occurs each cycle. Thus, a consistent waveform is presented to anode 13 for firing purposes. Typically the voltage across the winding 40 is a fractional value of the voltage across the winding 38 and is in phase with the voltage across the winding 38. However, if desired, the voltage across the winding 40 can be zero or can be some specially created waveform different from that across the winding 38.

When the SCR 1 conducts through the relay coil 43, the capacitor 44 is charged. When the SCR 1 goes off due to the drop in anode potential, the capacitor 44 will discharge through the relay winding 43 whereby to hold said relay in its activated state at least until the start of the next positive half cycle of said source 4. Thus, said relay will be continuously energized as long as the bridge 8 is on the proper side of null and provide a signal to be used as desired. When the circuit is used in a liquid level control, the relay controlled by the winding 43 may control suitable pumps or valves controlling liquid flow.

It will be apparent that the control circuit embodying the invention may be used with the bridge 8 omitted therefrom if other circuitry is provided or if the variable to be measured has an output similar to that of the bridge 8. Thus, such circuitry or variable should ideally provide a negative voltage drop from terminal 2 to terminal 3 for a quiescent detector and a positive voltage drop from terminal 2 to terminal 3 for a conducting detector having the polarity of SCR 1 shown. The circuitry or variable should also provide a suitable voltage to the bottom of the resistor 31 which is preferably a correctly phased A.C. voltage for the reasons above described.

Although a particular preferred embodiment of the invention has been disclosed hereinabove for purposes of illustration, modifications or variations of such disclosure lying within the scope of the appended claims are fully contemplated.

What is claimed is:

1. A detector circuit responsive to a change in an input signal, comprising the combination:
   a source of electrical energy of reversible polarity;
   a trigger device having a first input electrode, a second input electrode, and at least a first output electrode;
   a load and means connecting said load between said source of electrical energy and said first output electrode;
   a pair of signal input terminals;
   means for connecting said first input electrode of said trigger device to one of said signal terminals; and
   diode means connected between said second input electrode of said trigger device and the other signal terminal for providing a potential on said second input electrode of said trigger device in excess of a predetermined potential with respect to the potential of said first input terminal of said trigger device when said source polarizes said first output electrode of said trigger device for nonconduction.

2. A detector circuit responsive to a change in an input signal, comprising the combination:
   a source of electrical energy;
   a trigger device having a first input electrode, a second input electrode, and at least a first output electrode;
   a load and means connecting said load between said source of electrical energy and said first output electrode;
   a pair of signal input terminals;
   means for connecting said first input electrode of said trigger device to one of said signal terminals; and
   semiconductor means connected between the second input electrode of said trigger device and the other signal terminal for providing a current flow path therebetween having a voltage drop which varies with temperature in accordance with a temperature coefficient of the same direction and of similar magnitude as the temperature coefficient of the voltage drop from said first to said second input electrode of the trigger device.

3. The device defined in claim 2 in which said second input electrode connected means includes a pair of diodes in series anode to cathode, the cathode of one of such diodes being connected to said second input electrode of said trigger device and in which said means connecting said first input electrode and said one signal input terminal includes means for providing a voltage drop from said one signal terminal to said first input electrode substantially equal to the difference between the sum of the forward voltage drops across said diodes and the forward first to second input electrode voltage drop of said trigger.

4. A detector circuit responsive to a change in an input signal, comprising the combination:
   a source of electrical energy;
   a trigger device having a first and a second input electrode, and at least a first output electrode;

a load and means connecting said load between said source of electrical energy and said first output electrode trigger device;
a pair of signal input terminals;
means for connecting said first input electrode of said trigger device to one of said signal terminals; and
a nonlinear circuit connected between the other signal terminal and the second input electrode of said trigger device having a voltage drop substantially equal to the voltage drop between said first and second input electrodes of said trigger device at the time of triggering of said trigger device, and bias means for forward biasing said nonlinear circuit to achieve said voltage drop of said nonlinear circuit.

5. A detector circuit responsive to a change in an input signal, comprising the combination:
at least one source of electrical energy;
a semiconductor trigger device having a first and second input electrodes and at least a first output electrode;
a pair of signal input terminals;
means for connecting said first input electrode and said second input electrode of said trigger device respectively to one signal input terminal and the other signal input terminal;
an energy storing load and a diode and means connecting said load, diode and source in series and to said trigger device and further means connected to said semiconductor trigger device for supplying electrical energy of consistent waveform across said second input electrode and said output electrode, all cooperable for insuring consistent triggering of said trigger device.

6. A trigger circuit, comprising the combination:
an A.C. power source;
a semiconductor trigger device having first and second input electrodes and at least one output electrode;
a diode and a load in a series path therewith;
a path having at least a resistive component;
means connecting said series path, said resistive path and said A.C. source to form at least a two-terminal network, the path between said diode and said load being free of connection to said resistive path;
means connecting said network to at least one output electrode and to said second input electrode of said trigger device;
whereby said network assures consistent waveform of at least one output electrode to provide for correct triggering of said semiconductor trigger device.

7. An impedance sensing circuit, comprising the combination:
an A.C. power source;
a bridge circuit including a pair of input terminals, a pair of output terminals, an impedance to be sensed and a control impedance and means connecting said A.C. power source across said input terminals of said bridge;
a detector connected across said output terminals and including a semiconductor trigger device having first and second input electrodes and at least one output electrode, said detector circuit connecting the first and second input electrodes of said semiconductor trigger device to first and second ones, respectively, of said output terminals of the bridge;
a load, a diode and means for connecting same to said A.C. source, said load, diode and connecting means being in a first series path, said first series path being connected to an output electrode and the second input electrode of said semiconductor trigger device;
means having at least a resistive component and means in a second series path therewith for connecting same to said A.C. source, said second series path being connected to an output electrode and second input electrode of said semiconductor trigger device;
whereby said first and second series paths interact to assure consistent waveform of at least one output electrode to provide for correct triggering of said semiconductor trigger device.

8. An impedance sensing circuit, comprising the combination:
an A.C. power source;
a bridge circuit including a pair of input terminals, a pair of output terminals, an impedance to be sensed and a control impedance and means connecting said A.C. power source across said input terminals of said bridge;
a detector connected across said output terminals and including a semiconductor controlled rectifier, said detector circuit connecting the gate and cathode of said semiconductor controlled rectifier to first and second ones, respectively, of said output terminals of the bridge;
a load connected in series with the anode and cathode of said semiconductor controlled rectifier and said A.C. power source;
a diode having one electrode connected between said first output terminal of said bridge and said gate and having another electrode connected to said second output terminal of said bridge for maintaining the forward gate-to-cathode voltage of said semiconductor controlled rectifier below a predetermined level;
whereby passage of the bridge balance through null in one direction will cause said semiconductor controlled rectifier to conduct through said load.

9. An impedance sensing circuit, comprising the combination:
an A.C. power source;
a bridge circuit including a pair of input terminals, a pair of output terminals, an impedance to be sensed and a control impedance and means connecting said A.C. power source across said input terminals of said bridge;
a detector connected across said output terminals and including a semiconductor controlled rectifier, said detector circuit connecting the gate and cathode of said semiconductor controlled rectifier to first and second ones, respectively, of said output terminals of the bridge;
a load connected in series with the anode and cathode of said semiconductor controlled rectifier and said A.C. power source;
a diode connected between said second output terminal of said bridge and said cathode of said semiconductor controlled rectifier and a resistance connected between one of said input terminals of the bridge and said cathode of said semiconductor controlled rectifier, said diode having a voltage vs. current characteristic similar to those of the gate-to-cathode path of said semiconductor controlled rectifier so that the potential across the gate and cathode of said semiconductor controlled rectifier which is required to fire same will occur at the null point of the bridge and so that the firing of the semiconductor controlled rectifier is substantially independent of voltage changes in the A.C. source;
whereby passage of the bridge balance through null in one direction will cause said semiconductor controlled rectifier to conduct through said load.

10. An impedance sensing circuit, comprising the combination:
an A.C. power source;
a bridge circuit including a pair of input terminals, a pair of output terminals, an impedance to be sensed and a control impedance and means connecting said A.C. power source across said input terminals of said bridge;
a detector connected across said output terminals and including a semiconductor controlled rectifier, said detector circuit connecting the gate and cathode of said semiconductor controlled rectifier to first and second ones, respectively, of said output terminals of the bridge;

a load connected in series with the anode and cathode of said semiconductor controlled rectifier and said A.C. power source;

a diode connected between said second output terminal of said bridge and said cathode of said semiconductor controlled rectifier and a resistance connected between one of said input terminals of the bridge and said cathode of said semiconductor controlled rectifier wherein said diode and resistance prevent erroneous operation of said semiconductor controlled rectifier;

whereby passage of the bridge balance through null in one direction will cause said semiconductor controlled rectifier to conduct through the load.

11. An impedance sensing circuit, comprising the combination:

an A.C. power source;

a bridge circuit including a pair of input terminals, a pair of output terminals, an impedance to be sensed and a control impedance and means connecting said A.C. power source across said input terminals of said bridge;

a detector connected across said output terminals and including a semiconductor controlled rectifier, said detector circuit connecting the gate and cathode of said semiconductor controlled rectifier to first and second ones, respectively, of said output terminals of the bridge;

a load connected in series with the anode and cathode of said semiconductor controlled rectifier and said A.C. power source;

a first diode having one terminal connected between said first output terminal of said bridge and said gate, and having its other terminal connected to said second output terminal of said bridge for maintaining the forward gate-to-cathode voltage of the semiconductor controlled rectifier below a predetermined level; and a second diode in parallel with said first diode and directed oppositely thereto for rectifying A.C. voltage applied thereto by passing D.C. pulses which are out of phase with and opposed in sign to the rectified signal passed by said first diode whereby to minimize the D.C. current in said bridge caused by said first diode;

whereby passage of the bridge balance through null in one direction will cause said semiconductor controlled rectifier to conduct through said load.

12. An impedance sensing circuit, comprising the combination:

an A.C. power source;

a bridge circuit including a pair of input terminals, a pair of output terminals, an impedance to be sensed and a control impedance and means connecting said A.C. power source across said input terminals of said bridge;

a detector connected across said output terminals and including a semiconductor controlled rectifier, said detector circuit connecting the gate and cathode of said semiconductor controlled rectifier to first and second ones, respectively, of said output terminals of the bridge;

a load connected in series with the anode and cathode of said semiconductor controlled rectifier and said A.C. power source;

a first diode;

a second diode having a temperature dependent resistance network in parallel therewith connected in series with the first diode producing a series combination, said series combination being connected between cathode of said semiconductor controlled rectifier and said second output terminal of said bridge;

bias means for biasing the said series combination;

a third diode connected between the gate of said semiconductor controlled rectifier and said first output terminal of said bridge, said first, second, and third diodes, said semiconductor controlled rectifier, and said temperature dependent network being selected so as to achieve change of state of said load substantially at bridge null;

whereby passage of the bridge balance through null in one direction will cause said semiconductor controlled rectifier to conduct through said load.

13. An impedance sensing circuit, comprising the combination:

an A.C. power source;

a bridge circuit including a pair of input terminals, a pair of output terminals, an impedance to be sensed and a control impedance and means connecting said A.C. power source across said input terminals of said bridge;

a detector connected across said output terminals and including a semiconductor controlled rectifier, said detector circuit connecting the gate and cathode of said semiconductor controlled rectifier to first and second ones, respectively, of said output terminals of the bridge;

a load connected in series with the anode and cathode of said semiconductor controlled rectifier and said A.C. power source;

a firing correction circuit comprising a second supply of alternating current, means including a resistance connecting said second supply to said anode of said semiconductor controlled rectifier, said load being isolated from said anode by a diode connected between said semiconductor controlled rectifier and said load, whereby said firing correction circuit stabilizes the firing of said semiconductor controlled rectifier;

whereby passage of the bridge balance through null in one direction will cause said semiconductor controlled rectifier to conduct through said load.

14. The device defined in claim 13 in which said second supply of alternating current comprises an impedance having a voltage drop thereacross which impedance is connected in series with said load and said A.C. power source including a further impedance in series with the abovementioned impedance, an additional voltage drop being present across said further impedance, said resistance being connected in series with both said impedances for energization by the sum of said voltage drops.

15. The device defined in claim 12 in which said temperature dependent resistance network comprises a first leg in parallel with said second diode comprising a resistance and a thermistor in series and a further resistance in parallel with said diode.

16. The device defined in claim 10 in which the impedance sensing circuit is a liquid level sensing circuit, the impedance to be sensed is liquid level probe and the load is a liquid level control.

17. A detector circuit responsive to a change in polarity in an input signal, comprising the combination:

a source of electrical potential;

a trigger device having a first input electrode, a second input electrode and at least a first output electrode;

a load and means connected to said load and said first output electrode of said trigger device for placing a recurrent potential on said first output electrode to assure reliable firing of said trigger device;

a pair of signal input terminals;

means for connecting said first input electrode of said trigger device to one of said signal terminals;

nonlinear means connected between said first input electrode and the other of said signal terminals for limiting the peak forward voltage applied to said gate first input electrode;

means connected between said second input electrode of said trigger device and said other signal terminal energizable for controlling current flow between said second input electrode and said other signal terminal.

18. The device defined in claim 10 including a second diode having its anode connected to said second output terminal and its cathode connected between said first output terminal and said gate for limiting the gate-to-cathode voltage of said semiconductor controlled rectifier;

a third diode connected between said semiconductor controlled rectifier and said load, the anode of said semiconductor controlled rectifier being connected to the cathode of said third diode;

means providing a further source of alternating voltage of magnitude in excess of that of said first-mentioned source and means connecting said second source to the cathode of said diode for insuring conduction of said semiconductor controlled rectifier when triggered on positive half cycles of the alternating current source independently of the load.

19. A detector circuit responsive to a change in an input signal, comprising the combination:

a source of electrical energy;

a trigger device having a first and a second input electrode, and at least a first output electrode;

a load and means connecting said load between said source of electrical energy and said first output electrode trigger device;

a pair of signal input terminals;

means for connecting said first input electrode of said trigger device to one of said signal terminals; and a nonlinear semiconductor connected between the other signal terminal and the second input electrode of said trigger device having a voltage drop substantially equal to the voltage drop between said first and second input electrodes of said trigger device so that said trigger device changes state when substantially zero voltages occurs between said signal input terminals.

20. The circuit defined in claim 19 in which said nonlinear semiconductor comprises a first diode and including a second diode and means connecting same across said first and second input electrodes for bypassing excessive reverse current around said trigger device and preventing excess reverse voltages across said first and second input electrodes and for acting with said first mentioned diode to limit peak input to said trigger device.

21. The circuit defined in claim 19 in which said nonlinear semiconductor comprises a first diode and including a second diode connected across said first and second input electrodes for limiting the reverse voltage drop thereacross and a third diode connected between the first input electrode and the other of said signal input terminals for limiting the peak forward voltage across said first and second input electrodes, said second and third diodes together with said first mentioned diode defining a network for limiting the peak input to said trigger device.

22. The circuit defined in claim 19 in which said nonlinear semiconductor comprises a first diode and including a further diode connected between said first input electrode and said other signal input to bypass a portion of the forward current around said first and second input electrodes and limit the peak forward voltage applied to said first input electrode, said first mentioned and said second diode acting to reduce excessive current in either direction through said first input electrode.

23. The circuit defined in claim 19 in which said nonlinear semiconductor comprises a first diode and including a bridge circuit comprising a pair of bridge input terminals and a pair of bridge output terminals, as impedance to be sensed and means connecting said source of electrical energy across said bridge input terminals and means connecting said bridge output terminals to said signal input terminals.

24. The device defined in claim 23 including a further diode connected between said first and second input electrodes for limiting the reverse voltage drop thereacross.

25. The circuit defined in claim 23 including a further diode connected between said first input electrode and said other signal terminal and oriented for bypassing a portion of the forward current around said first and second input electrodes and limiting the peak forward voltage drop across.

26. The circuit defined in claim 23 including second and third diodes and means connecting same to said first input electrode, and means connecting the other sides of said second and third diodes to opposite sides of said first mentioned diode, said second and third diodes respectively being oriented for limiting the peak reverse and forward voltage drops across said first and second input electrodes.

References Cited

UNITED STATES PATENTS

| | | | |
|---|---|---|---|
| 2,543,620 | 2/1951 | Anderson et al. | 317—153 |
| 3,103,618 | 9/1963 | Slater | 307—88.5 |
| 3,104,385 | 9/1963 | Evalds | 317—153 |
| 3,113,249 | 12/1963 | Robb | 307—88.5 |
| 3,154,695 | 10/1964 | MacGregor et al. | 307—88.5 |
| 3,159,755 | 12/1964 | Duncan | 307—88.5 |
| 3,165,688 | 1/1965 | Gutzwiller | 307—88.5 |
| 3,176,161 | 3/1965 | Vertrees | 307—88.5 |
| 3,222,583 | 12/1965 | Gutzwiller | 323—22 |
| 3,296,498 | 1/1967 | Chasanoff et al. | 307—88.5 |

OTHER REFERENCES

Pub. I: Grafham, "Using Low Current Silicon Controlled Rectifiers and Silicon Controlled Switches," General Electric application. Note 200.19, March 1962, p. 11.

Pub. II: Gutzwiller, "Phase-Controlling Kilowatts With Silicon Semiconductors," General Electric publication, reprinted from May 1959 issue of Control Engineering, p. 1.

Pub. III: "Temperature-Controlled Static Switching," New Design Ideas From Solid State Products, Inc., No. 8 of a series, 2 pages, November 1961.

ARTHUR GAUSS, *Primary Examiner.*

R. H. EPSTEIN, J. D. FREW, *Assistant Examiners.*